June 29, 1954
C. BOLING ET AL
2,682,157
GAS SEPARATION
Filed Nov. 3, 1950
3 Sheets-Sheet 1
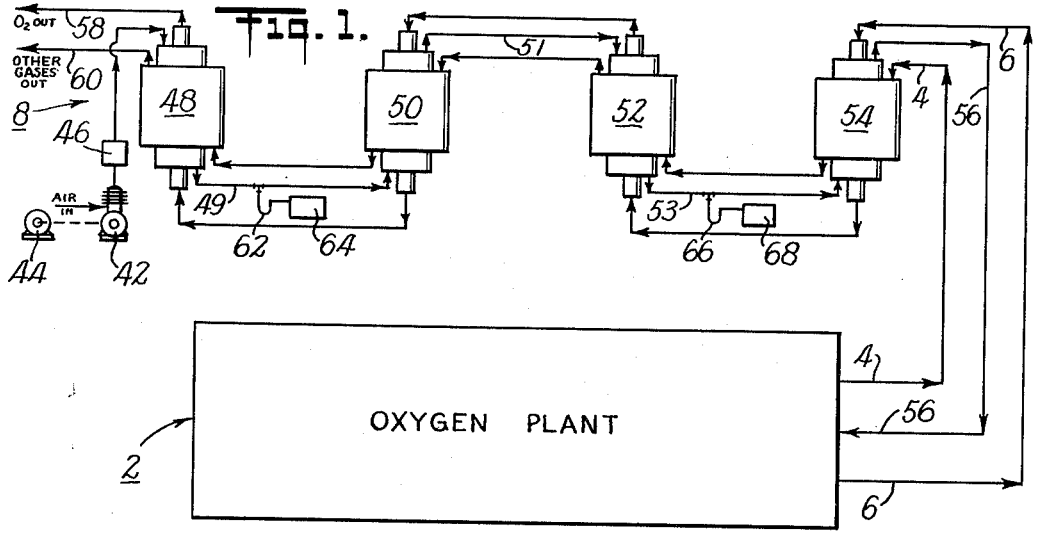
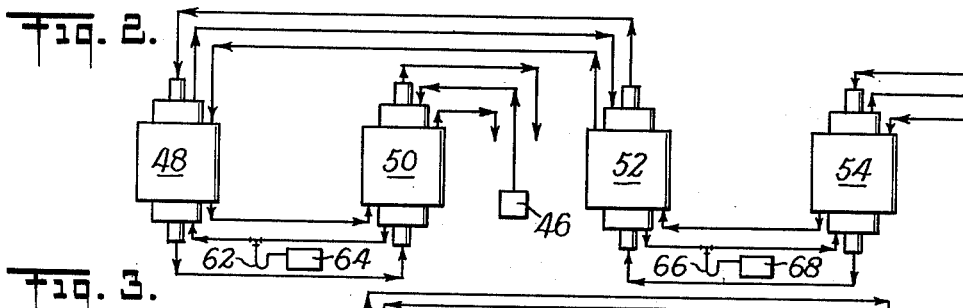
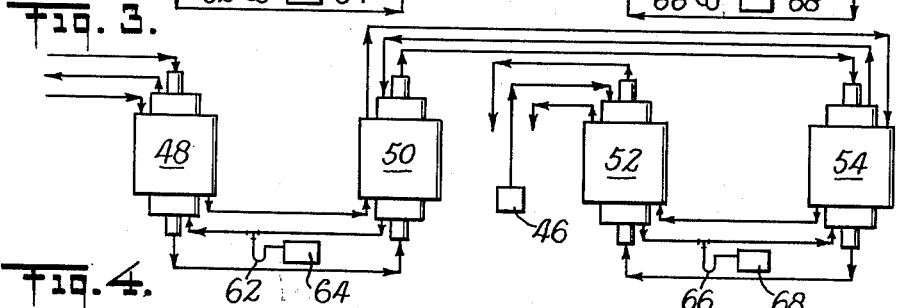
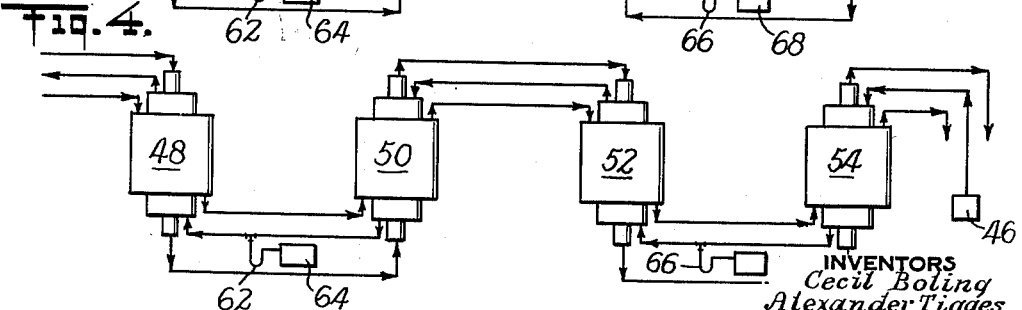
INVENTORS
Cecil Boling
Alexander Tigges
BY
Curtis, Morris & Safford
ATTORNEYS June 29, 1954

C. BOLING ET AL 2,682,157

GAS SEPARATION

Filed Nov. 3, 1950

INVENTORS
Cecil Boling
Alexander Tigges
BY
Curtis, Morris & Safford
ATTORNEYS

June 29, 1954 C. BOLING ET AL 2,682,157
GAS SEPARATION
Filed Nov. 3, 1950 3 Sheets-Sheet 3

INVENTORS
Cecil Boling
Alexander Tigges
BY
Curtis, Morris + Safford
ATTORNEYS

Patented June 29, 1954

2,682,157

UNITED STATES PATENT OFFICE 2,682,157

GAS SEPARATION

Cecil Boling, Brewster, and Alexander J. Tigges, New York, N. Y., assignors to The Heat-X-Changer Co., Inc., Brewster, N. Y.

Application November 3, 1950, Serial No. 193,838

15 Claims. (Cl. 62—122)

This invention relates to the removal of a condensable constituent from a gas or vapor mixture, and more in particular it relates to a system for removing water vapor from air during the manufacture of oxygen and to the removal of the moisture from the processing equipment. This invention also relates particularly to the removal of carbon dioxide from air.

In the production of oxygen by the partial distillation of air, a great deal of difficulty has been encountered because of the initial presence in all air of some water vapor and carbon dioxide gas which tend to build up in solid form on the walls of the apparatus. When oxygen is produced in that manner, the air is liquified by compressing and cooling it and then the oxygen is distilled off. During the cooling of the air, the water starts to condense and freeze so as to form ice or "frost" when the temperature of the air drops to substantially 32° F. In a similar way, the carbon dioxide in the air tends to form into crystals when the temperature drops below substantially —115° F. The present invention relates specifically to the removal of all of the water and carbon dioxide from air in an oxygen plant during the initial cooling of the air prior to the actual liquifying. An object of the present invention, therefore, is to provide apparatus of improved construction, and a method of operation, for producing oxygen in a manner which is of improved efficiency and which is dependable in producing oxygen of the desired purity. A further object is to provide a simplified system for carrying out the above which is thoroughly satisfactory in every respect. A further object is to provide an arrangement for the efficient removal of the above and other condensable constituents from a gas or gas mixture. These and other objects will be in part obvious and in part pointed out below.

In the drawings:

Figure 1 is a schematic showing of an oxygen plant incorporating the present invention;

Figures 2, 3 and 4 are similar to the upper portion of Figure 1 and show other phases of the cycle of operation;

Figure 5:
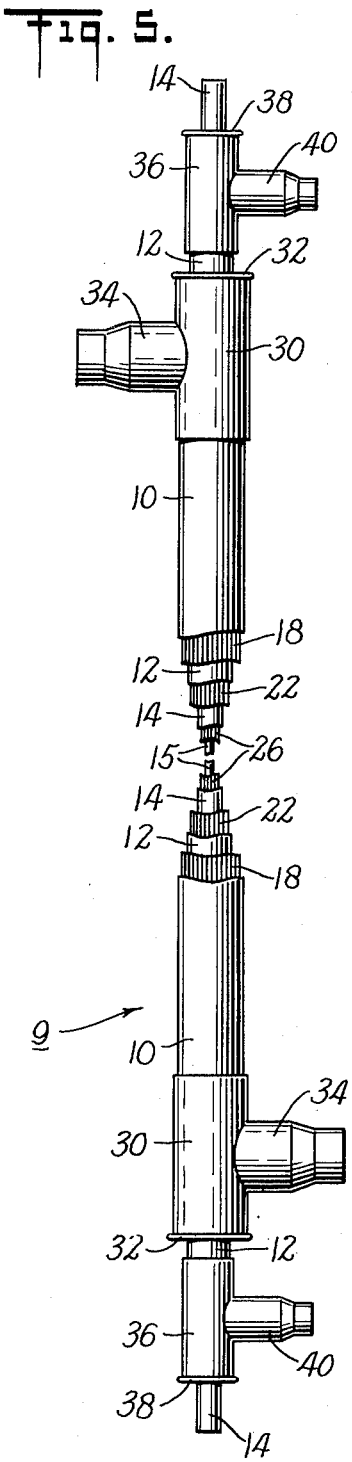
Figure 5 is a foreshortened view with parts broken away of one unit of the system of Figure 1.

Referring to Figure 1 of the drawings, the main portion of an oxygen plant is indicated at 2 and is of known construction and operation. In plant 2 the air is cooled under pressure by a cascade or step refrigeration system so that liquid air is produced. The liquid air is then passed to a distillation tower where the oxygen is separated from the remaining gases. The stream 4 of the remaining gases which is mainly nitrogen is then passed from the plant 2, and the oxygen passes in a stream 6 from the plant. Within plant 2 the gases are passed through heat transfer units but as the stream of gases 4 emerges it is at a low temperature, e. g., —258° F., and the oxygen in stream 6 is also at a low temperature, e. g., —288° F.

In accordance with the present invention, these cold gases are utilized to cool the incoming air passing to plant 2 and also to remove the water and carbon dioxide from the air, all in an efficient and dependable manner. Thus, from some standpoints the present invention may be considered as involving a highly efficient economizer section forming part of an oxygen plant. The invention, however, gives added advantages, and also contemplates, in its broader aspects, the utilization of apparatus of the type herein disclosed, and the mode of operation herein disclosed, to solve other problems which arise in this and other fields.

In the illustrative embodiment of the present invention the economizer section 8 of an oxygen plant is formed of three-hundred sixty heat transfer units, each of which consists of four identical triple-fluid heat transfer sections 9 having finned tube portions of ten foot lengths. Each of the heat transfer sections 9 is of the type shown in Figures 5 and 6 with four concentrically positioned tubes; namely, an outer tube 10, an intermediate tube 12, a center tube 14, and an inside tube 15. Referring to Figure 6, between tubes 10 and 12 there is an annular passageway 16 in which is positioned a compressed fin construction 18, and between tubes 12 and 14 there is a similar annular passageway 20 in which is positioned a compressed fin assembly 22. The center tube 14 provides a third passageway 24 in which there is a compressed fin assembly 26 which is held in place by the inside tube 15 which is a fin compressing tube and is open at both ends so as to form part of passageway 24. Referring now again to Figure 5, the ends of passageway 16 are provided with connected headers 30 having annular end plates 32 and integral connecting T-pipes 34. The ends of passageway 20 are similarly closed by headers 36 having annular end plates 38 and T-connections 40. The ends of passageway 24 are unobstructed and tube 14 is connected directly to the connecting pipes of the system.

Figure 6:
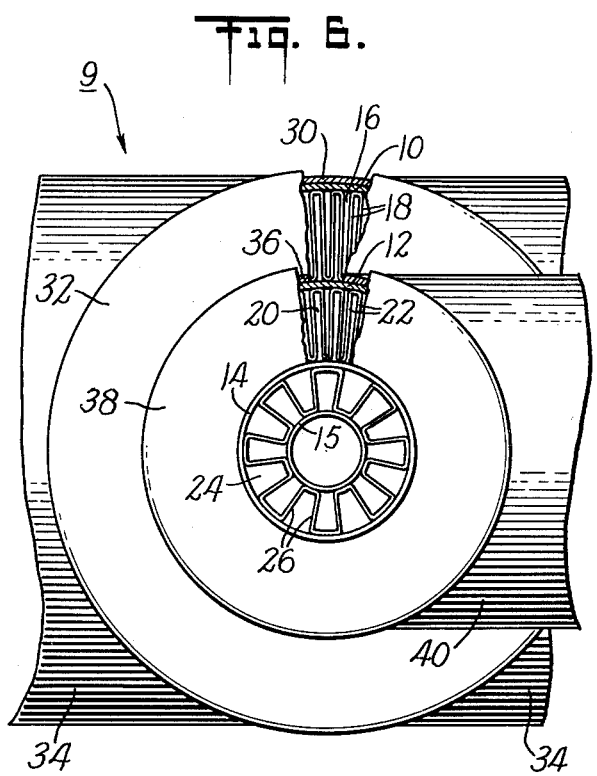
Figure 6 is an enlarged end view of the unit of Figure 5.

During construction of the apparatus of Figures 5 and 6 the fin assembly 18 is positioned within tube 10 and tube 12 is positioned within the fin assembly. Tube 12 is then expanded until the fin assembly is placed under substantial compression. This compression is great enough to cause the fin assembly to have intimate heat transfer relationships with the tube walls which confine it. Furthermore, even when the apparatus is subjected to extreme temperature changes, the high heat transfer relationship is maintained even though there is a tendency for the tubes and the fin assembly to expand or contract different amounts. After tube 12 has been expanded, the fin assembly 22 and tube 14 are positioned within tube 12 and tube 14 is expanded. Here again the expansion of the inside tube is sufficient to place the fin assembly under substantial compression and give good heat transfer relationships with both tube walls for all conditions of operation. Fin assembly 26 and tube 15 are then positioned within tube 14, and tube 15 is expanded so as to place its fin assembly 26 under substantial compression to give the same results as with fin assemblies 18 and 22. As pointed out above, the ends of tube 15 are open so that the entire space within tube 14 is open to form passageway 24 for the flow of gases.

It is thus seen that a heat transfer assembly is provided, and the incoming air passes through the intermediate passageway 20 in good heat transfer relationship with oxygen flowing through the central passageway 24 and the other gases flowing through passageway 16. The excellent heat transfer relationship between each of the fin assemblies and the adjacent tube walls insures that heat will be carried from the air in passageway 20 to the gases in the other two passageways.

In the schematic showing of Figure 1, a heat transfer unit formed by a group of four of the heat transfer sections 9 of Figures 5 and 6 is shown, and the sections 9 are designated individually by the numerals 48, 50, 52 and 54, it being understood, illustratively, there are three-hundred sixty of these heat transfer units, each formed by four of the heat transfer sections 9. The flow through the four heat transfer sections of each of the three-hundred sixty units is identical, and a highly important cycling arrangement is provided which is also identical for each of the units; the flow and cycling will now be discussed. Referring to the upper left-hand portion of Figure 1, the incoming air is compressed by a compressor 42 driven by a motor 44, and the compressed air passes through an after-cooler 46 and into the top of the passageway 20 of the first heat transfer section 48. From the bottom of section 48 the air passes through a line 49 into the bottom of the passageway 20 of the next section 50, from the top of which it passes through a line 51 to the top of the passageway 20 of the next section 52, and from the bottom of section 52 the air passes through a line 53 to the bottom of the passageway 20 of the last section 54. The compressed air as now cooled passes from the top of section 54 through a line 56 to plant 2.

The oxygen from line 6 and the other gases from line 4 pass in counterflow relationship with the incoming air and therefore they pass downwardly through section 54, upwardly through section 52, downwardly through section 50, and upwardly through section 48; in each section the oxygen passes through the outer passageway 16 and the other gases pass through the inner passageway 24. The oxygen then passes for the desired use in a stream 58 and the other gases are passed for utilization or are discharged through a line 60. In this embodiment, under one set of conditions of operation, the incoming air enters section 48 at substantially 100° F.; it passes to section 50 at 36° F.; it passes to section 52 at −59° F.; it passes to section 54 at −156° F.; and it passes to line 56 at −250° F. As indicated above, the oxygen enters section 54 at −288° F., and it passes to unit 52 at −193° F.; it passes to unit 50 at −98° F.; it passes to section 48 at −40° F.; and it is discharged in line 58 at 90° F. The other gases in line 6 are at −258° F., and they pass from section 54 to section 52 at −171° F.; pass to section 50 at −84° F.; pass to section 48 at 3° F., and are discharged at 90° F.

With the above operation, substantially 90% of the moisture is removed from the air in section 48 and the temperature in this section being above freezing, the water flows with the air downwardly into line 49 which has a water discharge trap connection at 62 through which the condensate is discharged into a tank 64. In section 48 the condensing water absorbs a large part of the carbon dioxide gas from the air and it is discharged with the water. The air then passing up through section 50 gives up substantially of the remaining moisture, but here the temperature is below freezing and the moisture forms in ice crystals or frost. However, the ice crystals or frost form very slowly because the major portion of the water has been removed in section 48. The last traces of water and the remaining carbon dioxide form into crystals in section 52, but this accumulation is not great by comparison with the rate of accumulation of frost in section 50.

As indicated above, the system is operated in accordance with a predetermined cycle with the paths of flow being changed at predetermined intervals. Accordingly, after the system has been operated as shown in Figure 1 for a substantial period of time, for example, one hour, ice crystals or frost begin to accumulate sufficiently to interfere with the flow of the air and also to reduce the heat transfer rate, particularly in section 50. At this time the paths of flow for the gases are changed to that of Figure 2; thus, the compressed incoming air from the after-cooler 46 passes to section 50 and then to section 48 and, as before, to sections 52 and 54 in series; and, the paths of flow of the oxygen and the other gases is such as to maintain the counterflow relationship. With this arrangement, section 50 is operated at a temperature above freezing and, therefore, operates the same as section 48 in Figure 1, while section 48 now operates the same as section 50 in Figure 1. When the mode of operation of Figure 2 is started the frost is immediately melted and it flows down and is discharged through trap 62. As the operation continues, condensate forms in section 50 and is discharged through trap 62 the same as in Figure 1, and frost accumulates in section 48 while the carbon dioxide crystals accumulate in section 52.

After a further similar period of operation, the paths of flow are again changed so as to be that of Figure 3 so that the compressed air from the after-cooler 46 passes first to section 52 and thence in series to sections 54, 50 and 48, and here again the paths of flow of the oxygen and other gases are changed to maintain the counter-flow relationship. With the flows of Figure 3, section 52 is maintained above freezing so that condensate frozen therein melts at a rapid rate, and this and the additional condensate which forms flows downwardly and is discharged through a trap 66 and a tank 68.

Frost then accumulates in section 54 and carbon dioxide crystals form in section 50. After a further period of operation, the paths of flow are changed again so that the compressed air from the after-cooler 46 passes first to section 54 and thence successively to sections 52, 50 and 48, and the oxygen and other gases flow counter-current to the air. Here section 54 is above freezing and the accumulated frost and carbon dioxide crystals are melted and this and the additional condensate which forms is discharged through trap 66; while the frost accumulates in section 52, and carbon dioxide accumulates in section 50. After a further period of operation, the flow arrangement of Figure 1 is restored and the cycle is then repeated.

As indicated above, during each operation frost accumulates in one section, while carbon dioxide crystals accumulate with some ice crystals in the next section through which the air passes. During each cycle of operation the four stages involve operating each of the sections at a temperature above freezing so that the accumulated ice or frost is melted. At the time that the accumulated frost is melted in each section, the accumulated carbon dioxide crystals are also melted, and the carbon dioxide gas thus formed is immediately absorbed by the melting ice. It should be noted that the temperature in the section where the ice is melting is within the range where carbon dioxide is most readily absorbed by water. Therefore, the mode of operation insures that the accumulated carbon dioxide, which is in the form of crystals, and the carbon dioxide in the entering air are dissolved directly into the condensate and are removed.

Figure 7:
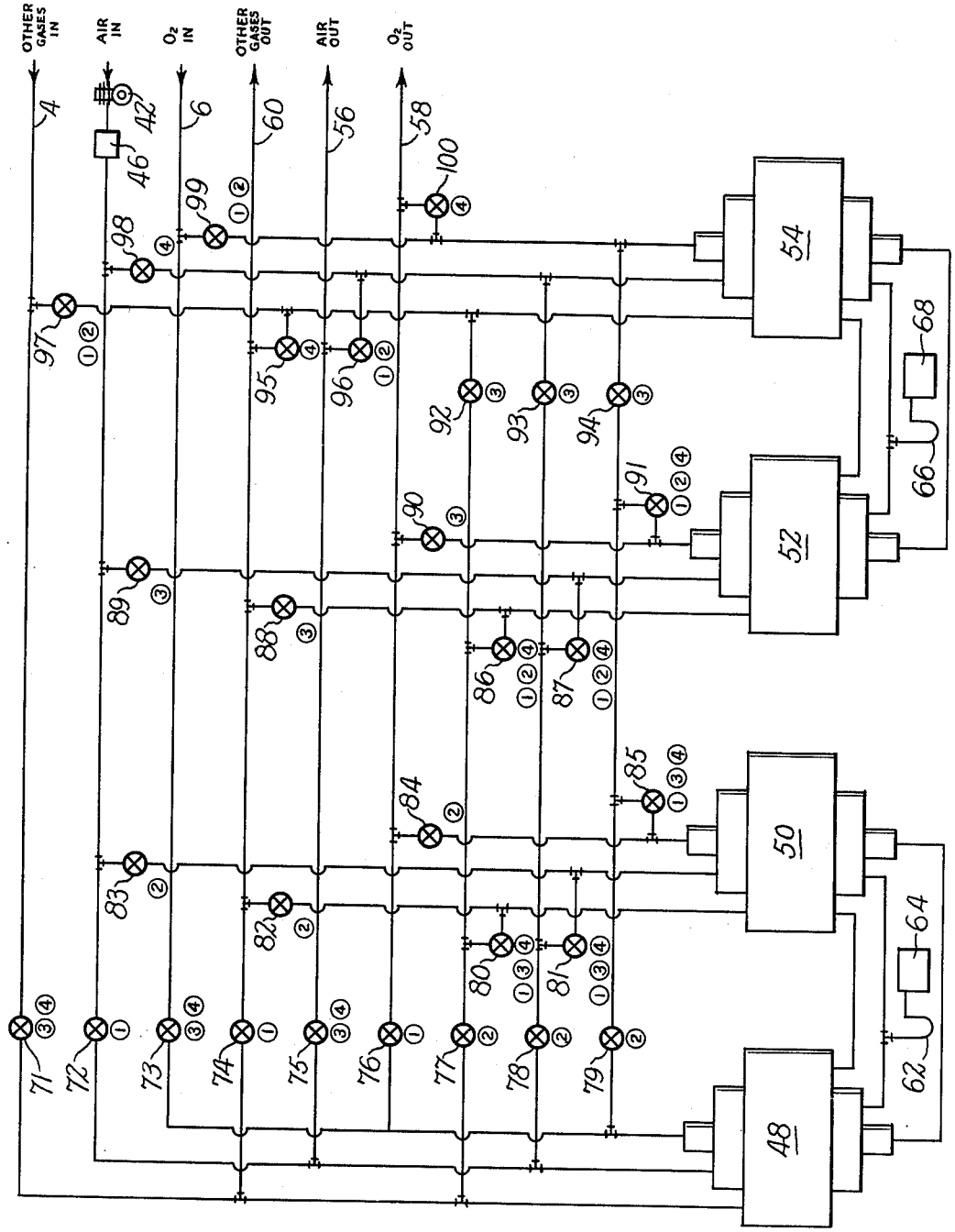
Figure 7 is similar to Figures 2, 3 and 4, but shows the valve system.

Referring now to Figure 7, wherein the valve arrangement is shown schematically, the gases are shown as entering and passing from the economizer section 8 from the right-hand end of the figure. The various valves which are numbered consecutively from 70 to 100 are normally closed and are opened pneumatically by air under pressure which is supplied to them through a master cyclic controller (not shown). This cyclic controller opens the valves in accordance with the predetermined cycle of operation and, as indicated, there are four steps or periods of operation during each cycle which are shown schematically in Figures 1 to 4.

In Figure 7 the numeral "1" with a circle around it has been placed adjacent each valve which is opened to obtain the operation of Figure 1, while the remaining valves are closed. Similarly, the numerals "2," "3" and "4" with circles around them have been placed adjacent the respective valves which are opened to obtain the operations of Figures 2, 3 and 4, respectively. Thus, at the beginning of the cycle of operation, as described above, the master controller opens all of the valves designated by the numeral "1" and these valves are held open during the first period of operation which has been illustratively referred to as one hour. At the end of this period of operation, the valves designated by the numeral "2" are opened while those not bearing the numeral "2" are closed. This procedure is continued for the third and fourth periods of operation, and the cycle is then repeated.

The operation is such that the closing and opening of valves occurs substantially instantaneously and these is no appreciable cessation of flow in the streams of gases to and from the economizer section 8 of Figure 1. With this embodiment of the invention all of the valves are positioned above the heat transfer sections, and the bottoms of the sections are permanently interconnected without valves.

The cycle of operation may be referred to as involving a sequence of flow of the air being cooled through four units forming zones in series. The first of these zones is above freezing, the second substantially below freezing, and the third and fourth are at successively lower temperatures. The cycle involves operating with a series flow of: first, through the units in the order "one," "two," "three," "four"; second, through the units in the order "two," "one," "three," "four"; third, through the units in the order "three," "four," "two," "one"; and, fourth, through the units in the order "four," "three," "two," "one." In the illustrative embodiment of the invention there is no removal of constituents from the air in the last unit through which the air passes, and under some conditions, operation and circumstances, this last unit may be omitted and the cycle of operation will then be as follows: through the units in the order one, two, three; through the units in the order two, one, three; and through the units in the order three, two, one. Furthermore, the sequence of the steps of the operation may be varied under some circumstances. However, the sequence of the illustrative embodiment involves changing the direction of flow through only two units at a time, and the flow through the remaining two units is unchanged. This insures uniform treating and substantially uninterrupted flow.

The fin assemblies 18, 22 and 26 are of corrugated sheet metal construction with radial fin portions and interconnecting web portions which contact the adjacent tube walls with sufficient pressure to insure good heat transfer between the gas streams. The fin assemblies do not interfere materially with the flow of gases therethrough and, therefore, the pressure drop through the sections is relatively small. With the cyclic operation outlined above, the simple and lightweight construction is truly practical in every respect. Thus, for example, the heat transfer surfaces are not subjected to mechanical stresses such as are involved when frost and carbon dioxide crystals are removed mechanically.

It is thus seen that water and carbon dioxide are removed from the air and yet there is no necessity for interchanging the paths of flow of the gas streams as is done with some modes of operation. This gives extremely efficient operation and has further advantages inherent in having each passageway always carrying the same gas or gases. Thus, the incoming air does not contaminate the oxygen stream and it is not made more lean in oxygen by being contaminated by the other gases which are mainly nitrogen. Furthermore, with the present system, all of the carbon dioxide is removed from the incoming air so that line 56 carries a mixture of gases comprising primarily nitrogen and oxygen, with traces of the rare gases, argon, krypton, etc. Thus, when the oxygen is removed, substantially pure nitrogen remains and this may be used by fixation or in other ways. The removal of the carbon dioxide, therefore, not only insures proper and efficient operation of plant 2, but it also makes available a supply of substantially pure nitrogen.

As indicated, the cycling operation is performed by pneumatically-operated valves which are centrally controlled and are quick-acting. Thus, the paths of flow are changed substantially instantaneously and the valving relationships between only two sections are changed at any one time. This improves the overall operation of the system which, in practice, gives substantially continuous flow and with assurance that a proper heat transfer relationship is maintained at all times.

In the above discussion of the illustrative embodiment of the invention, certain conditions of operation were set forth, and it is understood that there may be variations in the conditions of operation so as to give different temperature relationships. Furthermore, the operation may vary from that discussed above. As has been discussed above, the condensing of water tends to absorb and wash carbon dioxide from the air so that lesser quantities of the carbon dioxide form into crystals than would occur if the water were removed in another manner. Thus, in Figure 1, a relatively high percentage of the carbon dioxide is dissolved directly into the condensate in section 48. At the same time, carbon monoxide and dust particles are washed from the air. This absorbing and washing action by the condensate is promoted by the fin assembly construction which permits free flow through the passageways, but provides maximum surface contact. This fin construction in all of the passageways insures high heat transfer between the various streams of the gases, and it also provides minimum pressure drop, even with rapid rates of flow. This not only insures maximum heat transfer with minimum pressure drop, but it also insures uniformity of operation at all times and in all portions of the system. This effects efficiency in design and operation, and provides for wide variations in construction.

It has been pointed out above that certain aspects of this invention apply to processes other than the illustrative embodiment. For example, in producing hydrogen from producer gas, the present system may be used to remove condensables.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

We claim:

1. In a system of the character described wherein an incoming stream of air is being delivered to the system for the separation of oxygen therefrom, multiple-section means to cool the incoming air by passing it along a heat interchange path in counter-current and heat transfer relationship with the gas streams of oxygen and other gases passing from the system, said means comprising structure forming a plurality of sections all of which continuously provide for the flow of the gases therethrough at all times during the entire period of operation of the system and each of which includes a passageway for each of the gas streams with the various passageways for each gas stream being connected in series, and means to alter the paths of flow of the gases whereby each stream of gas continues to flow through all of the same passageways but in a different order of the sections.

2. In a system for producing oxygen wherein incoming air is cooled by successive refrigeration operations to produce liquid air and the oxygen is then distilled off and the other gases are returned to gaseous form, a series of heat transfer sections all of which continuously provide for the flow of the gases therethrough at all times during the entire period of operation of the system and each of which provides one passageway for the incoming air and two other passageways respectively for oxygen and the other gases for all conditions of operation, and means to alter the paths of flow of the incoming air and the oxygen and the other gases whereby the incoming air passes through the various sections in accordance with a sequence different from the original sequence.

3. A system as described in claim 2 wherein the incoming air is maintained at a temperature above freezing while passing through the first of said sections through which it passes and its temperature is dropped sufficiently to form crystals of carbon dioxide while passing through a successive section, and wherein each cycle of operation includes a stage wherein the incoming air first enters each of said sections whereby the accumulated frost and carbon dioxide crystals are removed.

4. A system as described in claim 3 wherein said series of said heat transfer sections comprises four sections which may be identified as, section 1, section 2, section 3 and section 4, respectively, and wherein the cycle of operation involves four steps of operation which are carried on in a predetermined sequence and which comprise flowing the air through the sections during each of the steps in the order named: step 1, sections 1, 2, 3, 4; step 2, sections 2, 1, 3, 4; step 3, sections 3, 4, 2, 1; and step 4, sections 4, 3, 2, 1.

5. In a system for treating a stream of gases, a plurality of heat transfer sections all of which continuously provide for the flow of the gases therethrough at all times during the entire period of operation of the system and each of which has a passageway for the stream of gases to be cooled and means to refrigerate the passageways selectively to the following temperatures: one of said passageways at a temperature to condense and not congeal a condensable constituent of said stream of gases, one passageway at a temperature to congeal said constituent, and one passageway at a substantially lower temperature than the last-mentioned passageway; and means to control the flow of said stream of gases to be cooled through said passageways and to alter the sequence of flow and simultaneously to change the temperatures at which said passageways are maintained with the complete cycle of operation including operating the system with each of said passageways being maintained at each of the above-mentioned temperatures.

6. A system as described in claim 5 wherein the refrigeration effect for cooling said stream of gases is obtained by flowing a refrigeration medium at all times in counterflow relationship through all of said sections with respect to the flow of the stream of gases to be cooled.

7. A system as described in claim 6 which has in combination with it a plant for separating oxygen from nitrogen, and wherein the stream of gases to be cooled is compressed air flowing to the plant, and the refrigeration medium comprises separate streams of oxygen and nitrogen flowing from said plant.

8. A system as described in claim 7 wherein said plant comprises refrigeration and compressing means to liquify the air and means to separate the oxygen by partial distillation.

9. A system as described in claim 5 wherein one of said condensable constituents forms a liquid which absorbs and washes one or more of the other constituents from the stream of gases being cooled.

10. A system as described in claim 9 wherein the constituent which is condensed to a liquid is water, and wherein the water absorbs and washes carbon dioxide and impurities such as carbon monoxide and dust particles from the stream of gases.

11. A system as described in claim 9 wherein the major portion of the water is removed from the stream of gases by direct condensation and the last traces of water and carbon dioxide are removed by freezing, and wherein substantial portions of the heat transfer surfaces in each of the sections are formed by thin sheets of metal.

12. A system as described in claim 9 wherein each of said sections comprises a plurality of concentrically positioned tubes and a plurality of fin assemblies each of which comprises individual fin portions which extend longitudinally of the tubes and substantially radially with respect to the common axis of the tubes and wherein said fin assemblies are under substantial radial compression.

13. A system as described in claim 9 wherein each of said sections comprises three pipes positioned concentrically with two annular passageways respectively between the intermediate pipe and the outer pipe and inner pipe, and headers closing the ends of said passageways to provide T-connections thereto.

14. In the art of conditioning air for liquification, the steps of, cooling the air initially to a temperature slightly above freezing in a first cooling zone, cooling the air in a second cooling zone to a temperature sufficiently low to remove traces of water and carbon dioxide, cooling the air further in the third cooling zone, and alternating the directions of the flow whereby each of said cooling zones is maintained at the three temperature stages outlined in continuously repeated series.

15. In the art of separating oxygen and nitrogen, the steps of, flowing the air to a separating zone along a cooling path comprising a plurality of cooling zones, flowing the oxygen and nitrogen from said separating zone in separate streams in counterflow relationship with respect to the air thereby to produce the cooling of the air along said cooling path, and altering the flow of the air and the oxygen and nitrogen to cause the air to flow through said cooling zones in different sequences and to maintain the counterflow relationship continuously through all of said cooling zones.

References Cited in the file of this patent

UNITED STATES PATENTS

| Number | Name | Date |
| --- | --- | --- |
| 2,039,889 | De Baufre | May 5, 1936 |
| 2,116,191 | De Baufre | May 3, 1938 |
| 2,460,859 | Trumpler | Feb. 8, 1949 |